United States Patent
Ito

(10) Patent No.: US 8,810,521 B2
(45) Date of Patent: Aug. 19, 2014

(54) LIQUID CRYSTAL DISPLAY APPARATUS

(75) Inventor: Yukihiro Ito, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 2137 days.

(21) Appl. No.: 11/492,049

(22) Filed: Jul. 25, 2006

(65) Prior Publication Data

US 2007/0030242 A1    Feb. 8, 2007

(30) Foreign Application Priority Data

Aug. 2, 2005 (JP) ................................. 2005-223886

(51) Int. Cl.
  *G09G 5/00* (2006.01)
  *G02F 1/1333* (2006.01)
  *G06F 3/046* (2006.01)
  *G06F 3/041* (2006.01)
  *G02F 1/1335* (2006.01)

(52) U.S. Cl.
  CPC .......... *G02F 1/13338* (2013.01); *G02B 6/0068* (2013.01); *G02F 1/133615* (2013.01); *G02B 6/0081* (2013.01); *G06F 3/046* (2013.01); *G06F 3/0412* (2013.01)
  USPC .............................. 345/173; 345/102; 345/55

(58) Field of Classification Search
  USPC ....................... 345/173, 102, 55, 87
  See application file for complete search history.

(56) References Cited

U.S. PATENT DOCUMENTS

| | | | | |
|---|---|---|---|---|
| 7,196,695 B2 * | 3/2007 | Lin | | 345/173 |
| 2004/0189587 A1 * | 9/2004 | Jung et al. | | 345/102 |
| 2004/0189888 A1 * | 9/2004 | Ypu et al. | | 349/58 |

FOREIGN PATENT DOCUMENTS

| | | | |
|---|---|---|---|
| CN | 1266998 A | | 9/2000 |
| CN | 1534333 A | | 11/2003 |
| CN | 1506727 A | | 6/2004 |
| GB | 2 348 040 A | * | 9/2000 |
| GB | 2348040 A | | 9/2000 |
| JP | H05-55229 | | 7/1993 |
| JP | 2001-356323 | | 12/2001 |
| JP | 2004-280273 | | 10/2004 |
| JP | 2004-286777 | | 10/2004 |
| JP | 2004-302431 | | 10/2004 |
| JP | 2004-302433 | | 10/2004 |
| JP | 2005-173302 | | 6/2005 |

OTHER PUBLICATIONS

Patent Office of the People's Republic of China, Notification of the First Office Action, Issued Sep. 28, 2007.
Japanese Office Action dated Jun. 22, 2010.
English translation of Japanese Office Action.

* cited by examiner

*Primary Examiner* — William Boddie
*Assistant Examiner* — Leonid Shapiro
(74) *Attorney, Agent, or Firm* — Young & Thompson

(57) ABSTRACT

A plurality of LEDS used for a light source are mounted on the surface of an electromagnetic-induction touch panel in which coiled wiring is formed on a glass epoxy substrate. A dual-use touch-panel/backlight I/F FPC substrate is connected to the touch panel in order to feed power to the LEDs and to feed power and signals to the touch panel. A shield plate 7 is disposed on the reverse side of the touch panel, and a backlight light guide plate and a liquid crystal panel are disposed in the stated order on the side on which the LEDs are mounted. A liquid crystal panel I/F FPC substrate for feeding power to the liquid crystal panel is connected to the liquid crystal panel.

6 Claims, 4 Drawing Sheets

LIQUID CRYSTAL DISPLAY APPARATUS

BACKGROUND OF THE INVENTION

1. Field of the Invention

The present invention relates to a liquid crystal display apparatus provided with an electromagnetic-induction touch panel, and more particularly relates to a liquid crystal display apparatus incorporated in a mobile information terminal apparatus, a tablet personal computer, or another information processing apparatus.

2. Description of the Related Art

Display apparatuses having a touch panel are provided with both image display and information input functions, and are currently widely used in ATMs (automated teller machines) for financial institutions and in other equipment. In particular, electromagnetic-induction touch panels that detect electromagnetic energy generated in the panel by a dedicated pen can be operated only with this pen, even when the pen does not make direct contact with the panel. The panel can therefore be disposed further rearward from the liquid crystal panel. For this reason, liquid crystal display apparatuses provided with an electromagnetic-induction touch panel can easily be made smaller and thinner, and can be applied to tablet PCs (Personal Computer), PDAs (Personal Digital Assistant), and other personal information processing devices (Japanese Laid-open Patent Application No. 2004-280273 and Japanese Laid-open Patent Application No. 2004-302431).

FIG. 1 is an exploded perspective view of a portion of the configuration of a conventional liquid crystal display apparatus having a touch panel. In the conventional liquid crystal display apparatus having a touch panel 100, an electromagnetic-induction touch panel 102 in which, for example, a coil is formed on a glass epoxy substrate is disposed on a shield plate 107, and a light guide plate 105 and a liquid crystal panel 101 are disposed in the stated order on the touch panel 102, as shown in FIG. 1. A backlight interface (also referred to as I/F) flexible printed circuit (FPC) substrate 106 is bonded to the end portion of the light guide plate 105, and LEDs (Light Emitting Diode) 104 used as light sources for the backlight are mounted on the backlight I/F FPC substrate 106. Power is fed to the LEDs 104 via the backlight I/F FPC substrate 106. A touch-panel I/F FPC substrate 103 is connected to the touch panel 102 in order to feed power and signals to the touch panel 102, and a liquid crystal panel I/F FPC substrate 108 is connected to the liquid crystal panel 101 in order to feed power and signals to the panel.

Disclosed in Japanese Laid-open Patent Application No. 2004-280273 is a liquid crystal display apparatus having a touch panel in which the surface of the liquid crystal panel is provided with a hard layer composed of material that is harder than the touch pen in order to prevent damage to the areas with which the touch pen (dedicated pen) makes contact. In the liquid crystal display apparatus having a touch panel described in Japanese Laid-open Patent Application No. 2004-302431, the apparatus is made thinner by forming a group of transparent electrode coils for the touch panel on one of the substrates of the liquid crystal panel.

However, the prior art described above has the following problems. In a conventional small liquid crystal display apparatus, LEDs are commonly used as the light source, and an FPC on which a plurality of LEDs are mounted is fixed to the light guide plate. For this reason, in a conventional liquid crystal display apparatus 100 that has a touch panel and is configured in the manner shown in FIG. 1, the backlight I/F FPC substrate 106 on which the LEDs 104 are mounted is easily deformed by pressure applied by the touch pen when information is input, and there is a problem in that brightness nonuniformity is readily produced in the display image. This problem can be improved by fixing the LEDs 104 to the light guide plate 105 (see Japanese Laid-open Patent Application No. 2004-173302, for example), but this approach is still disadvantageous in that manufacturing costs increase due to the greater number of components and manufacturing steps.

SUMMARY OF THE INVENTION

An object of the present invention is to provide a liquid crystal display apparatus having a touch panel in which the occurrence of brightness nonuniformity can be reduced.

The liquid crystal display according to the present invention comprises a liquid crystal panel, a backlight light guide plate which is disposed behind the liquid crystal panel and which supplies light to the liquid crystal panel, an electromagnetic-induction touch panel disposed behind the light guide plate, and one or a plurality of backlight light sources fixed to the touch panel and used to feed light to the light guide plate.

In the present invention, a light source is fixed to a touch panel. Therefore, the position of the light source does not vary when pressure is applied from the exterior, and the occurrence of brightness nonuniformity can be reduced without an increase in the number of components.

A plurality of the light sources may be disposed on the touch panel along a side edge of the light guide plate. In such a case, light emitted from the light source enters the light guide plate from the side surface of the light source that faces the light guide plate. Also, the liquid crystal display apparatus may be configured with an electromagnetic noise shield plate disposed behind the touch panel. The touch panel can thereby be protected against the effect of electromagnetic noise in the environment. Light-emitting diodes can furthermore be uses for the light source.

The liquid crystal display apparatus may comprise a touch-panel wiring cable for feeding power and signals to the touch panel, and a light-source wiring cable for feeding power to the light source. The light source may alternatively be connected to the wiring substrate of the touch panel, and a wiring cable for feeding power and signals to the touch panel and feeding power to the light source may be connected to the wiring substrate. A flexible printed substrate, for example, may be used as the wiring cable.

In accordance with the present invention, a light source is fixed to the touch panel. Therefore, the position of the light source does not vary when pressure is applied from the exterior, and the occurrence of brightness nonuniformity in the display image can be reduced at low cost without an increase in the number of components and manufacturing steps.

DESCRIPTION OF THE PREFERRED EMBODIMENTS

Figure 2:
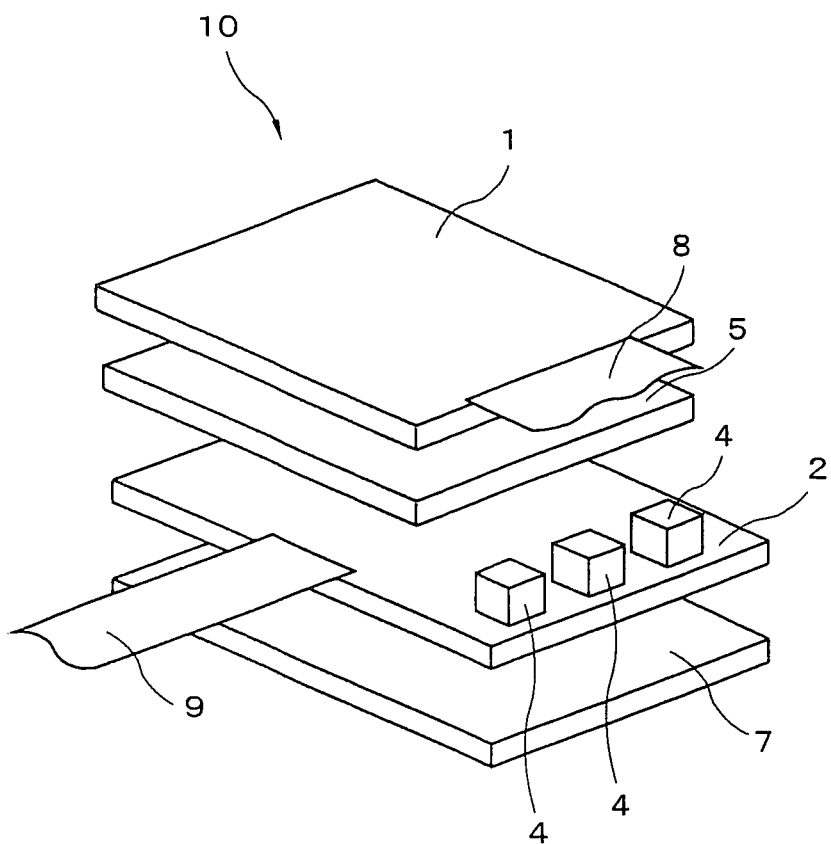
FIG. 2 is an exploded perspective view of a portion of the configuration of the liquid crystal display apparatus of the first embodiment of the present invention.
Figure 3:
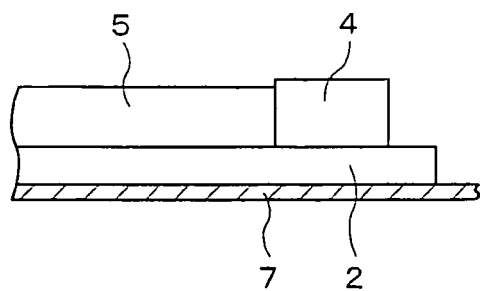
FIG. 3 is a cross-sectional view of the arrangement of LEDs in the liquid crystal display apparatus shown in FIG. 2.

The liquid crystal display apparatus according to embodiments of the present invention is described in detail below with reference to the attached diagrams. Described first is the liquid crystal display apparatus of the first embodiment of the present invention. FIG. 2 is an exploded perspective view of the liquid crystal display apparatus of the present embodiment, and FIG. 3 is a cross-sectional view of the arrangement of LEDs 4 in the liquid crystal display apparatus shown in FIG. 2. A liquid crystal panel 1 has been omitted in FIG. 3. The liquid crystal display apparatus 10 of the present embodiment is a liquid crystal display having a touch panel. An electromagnetic induction touch panel 2, a backlight light guide plate 5, and a liquid crystal panel 1 are disposed in the stated order on a shield plate 7 for protecting the apparatus against the effect of electromagnetic noise, as shown in FIG. 2.

The touch panel 2 in the liquid crystal display apparatus 10 has, for example, coiled wirings formed on a glass epoxy substrate; backlight wiring is formed on the surface that faces the light guide plate 5; and LEDs 4 used as light sources are mounted on the backlight wiring along the edge facing the light guide plate 5. A dual-use touch-panel/backlight I/F FPC substrate 9 is connected to the touch panel 2 as a wiring cable for feeding power to the LEDs 4 and for feeding power and signals to the touch panel 2. On the other hand, a liquid crystal panel I/F FPC substrate 8 is connected to the liquid crystal panel 1 as a wiring cable for feeding power to the liquid crystal panel 1.

The operation of the liquid crystal display apparatus 10 of the present embodiment is described next. In the liquid crystal display apparatus 10 of the present embodiment, power is fed from an external power source (not shown) to the LEDs 4 via the dual-use touch-panel/backlight I/F FPC substrate 9, and the LEDs 4 emit light. In this case, the LEDs 4 are disposed so as to make contact with the end face of the light guide plate 5, as shown in FIG. 3. Therefore, light emitted from the LEDs 4 enters the interior of the light guide plate 5 from the end face of the plate, and exits from the surface of side facing the liquid crystal panel 1. Also, power and signals for image display are fed to the liquid crystal panel 1 via the liquid crystal panel I/F FPC substrate 8, and a prescribed image is thereby displayed. Power and signals are also fed to the touch panel 2 via the dual-use touch-panel/backlight I/F FPC substrate 9, and positional information is output from the touch panel 2 when information has been input.

In the liquid crystal display apparatus 10 of the present embodiment, the LEDs 4 are fixed to the glass epoxy substrate of the touch panel 2. Therefore, the LEDs 4, which are the light source, are not liable to vary in position when pressure is applied with a touch pen or the like during information input. As a result, the occurrence of brightness nonuniformity in a display image can be reduced.

Figure 1:
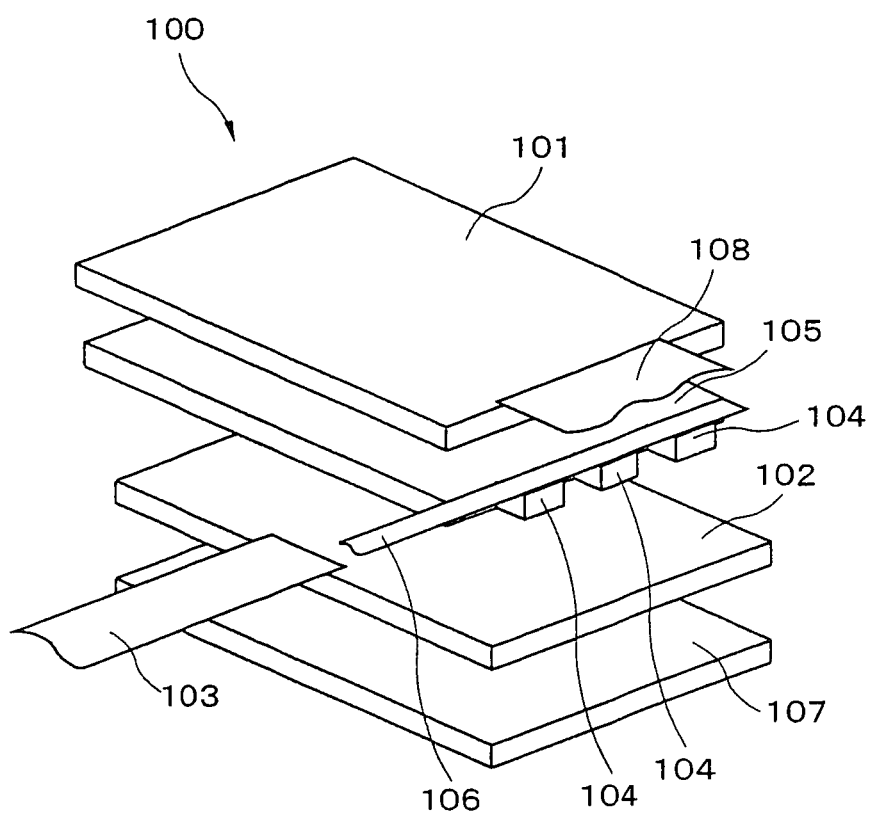
FIG. 1 is an exploded perspective view of a portion of the configuration of a conventional liquid crystal display apparatus with a touch panel.

The conventional liquid crystal display apparatus 100 shown in FIG. 1 requires three types of I/F FPC substrates, i.e., one for the touch panel, one for the backlight, and one for the liquid crystal panel. There is therefore a problem in that manufacturing costs are high and a large number of manufacturing steps is involved since the I/F FPC substrates must be inserted into a connector when incorporated into information processing apparatuses or the like. In the liquid crystal display apparatus 10 of the present embodiment, however, the I/F FPC substrate can be used both for the touch panel 2 and for the LEDs 4. Therefore, the number of FPC substrates can be decreased, and the manufacturing steps and costs can be reduced in comparison with a conventional liquid crystal display apparatus having a touch panel.

Figure 4:
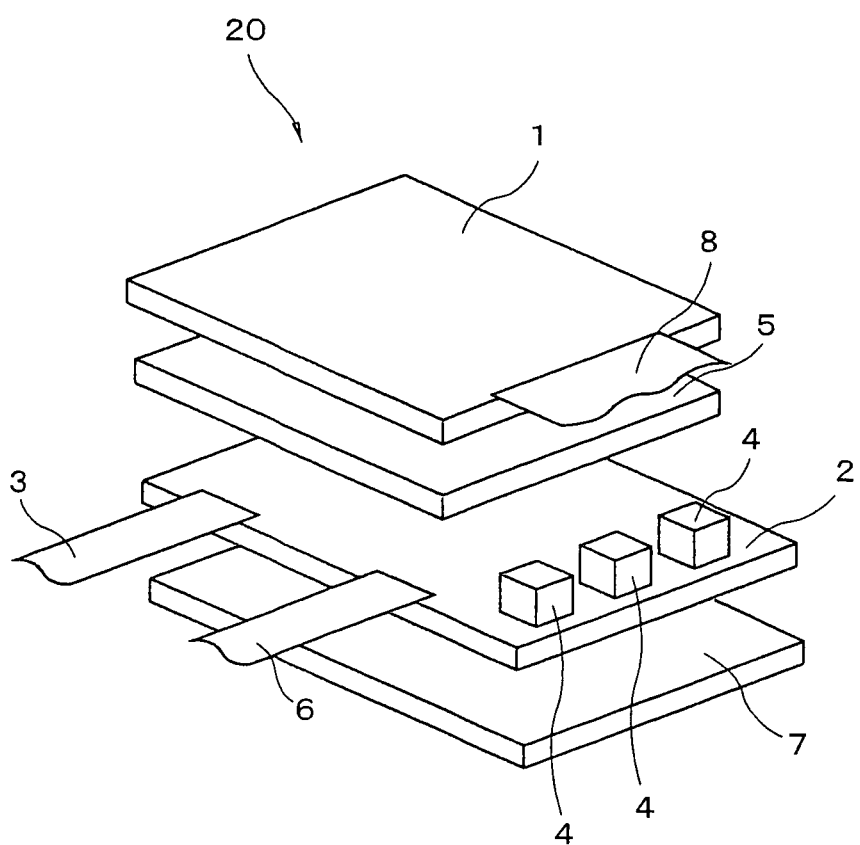
FIG. 4 is an exploded perspective view of a portion of the configuration of the liquid crystal display apparatus of the second embodiment of the present invention.

Described next is the liquid crystal display apparatus of the second embodiment of the present invention. FIG. 4 is an exploded perspective view of a portion of the configuration of the liquid crystal display apparatus of the second embodiment of the present invention. In FIG. 4, the same reference numerals are used for the same constituent elements of the liquid crystal display apparatus 10 shown in FIG. 2, and a detailed description of the same constituent elements is omitted. In the liquid crystal display apparatus of the first embodiment described above, the I/F FPC substrate was used for the touch panel 2 and the LEDs 4, but when a large electric current is required to cause the LEDs 4 to emit light, a backlight I/F FPC substrate 60 for feeding power to the LEDs 4 and a touch-panel I/F FPC substrate 3 for feeding power and signals to the touch panel 2 may be separately provided and connected to the touch panel 2 in the manner of the liquid crystal display apparatus 20 shown in FIG. 4. Except for the above-described differences in the liquid crystal display apparatus 20 of the present embodiment, the configuration is the same as the liquid crystal display of the first embodiment described above.

The operation of the liquid crystal display apparatus 10 of the present embodiment is described next. In the liquid crystal display apparatus 10 of the present embodiment, power is fed from an external power source (not shown) to the LEDs 4 via the backlight I/F FPC substrate 6, and the LEDs 4 emit light. Light emitted from the LEDs 4 enters the interior of the light guide plate 5 from the end face of the plate, and exits from the surface facing the liquid crystal panel 1. Also, power and signals for image display are fed to the liquid crystal panel 1 via the liquid crystal panel I/F FPC substrate 8, and a prescribed image is thereby displayed. Power and signals are also fed to the touch panel 2 via the touch-panel I/F FPC substrate 3, and positional information is output from the touch panel 2 when information has been input.

In the liquid crystal display apparatus 20 of the present embodiment, the LEDs 4 are mounted to the glass epoxy substrate of the touch panel 2. Therefore, the LEDs 4 are not liable to vary in position when pressure is applied from the exterior, and the occurrence of brightness nonuniformity in a display image can be reduced. Application can also be made when there is a large number of LEDs 4 and a large electric current must be fed to the I/F FPC substrate, because the backlight I/F FPC substrate 6 and a touch-panel I/F FPC substrate 3 are separately provided.

Figure 5:
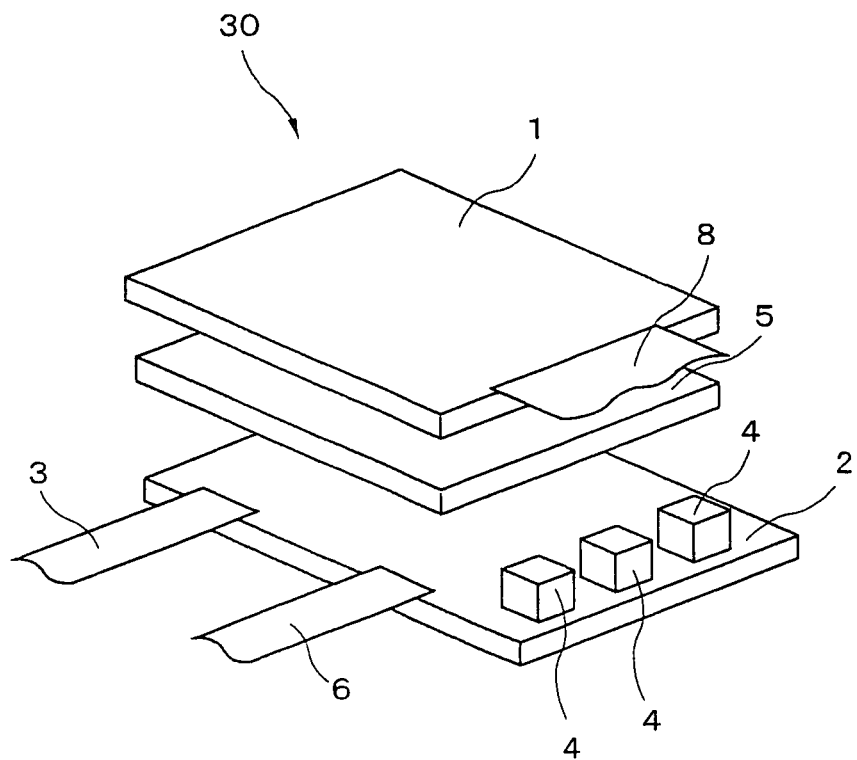
FIG. 5 is an exploded perspective view of a portion of the configuration of the liquid crystal display apparatus of the third embodiment of the present invention.
Figure 6:
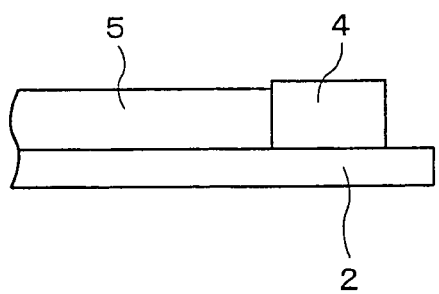
FIG. 6 is a cross-sectional view along the line B-B shown in FIG. 5.

Described next is the liquid crystal display apparatus of the third embodiment of the present invention. FIG. 5 is an exploded perspective view of a portion of the configuration of the liquid crystal display apparatus of the present embodiment, and FIG. 6 is a cross-sectional view of the arrangement of LEDs 4 in the liquid crystal display apparatus shown in FIG. 5. In FIGS. 5 and 6, the same reference numerals are used for the same constituent elements of liquid crystal display apparatus 10 of the first embodiment shown in FIGS. 2 and 3, and a detailed description of the same constituent elements is omitted. The electromagnetic-induction touch panel is easily affected by electromagnetic noise. Therefore, in the liquid crystal display apparatus of the first and second embodiments, a shield plate is disposed on the reverse side of the touch panel, i.e., the side opposite from the light guide plate. However, when the level of magnetic noise in the environment is low and is at a level at which the touch panel does not malfunction, the shield plate may be omitted in the manner of liquid crystal display apparatus 30 of the present embodiment shown in FIGS. 5 and 6.

Specifically, in the liquid crystal display apparatus 30 of the present embodiment, a backlight light guide plate 5 and a liquid crystal panel 1 are disposed in the stated order on the electromagnetic induction touch panel 2, and LEDs 4 used for the light source are mounted on the surface of touch panel 2 on the side that faces the light guide plate 5 along the end face of the light guide plate 5. Connected to the touch panel 2 are an backlight I/F FPC substrate 6 for feeding power to the LEDs 4, and a touch-panel I/F FPC substrate 3 for feeding power and signals to the touch panel 2. A liquid crystal panel I/F FPC substrate 8 for feeding power to the liquid crystal panel 1 is connected to the liquid crystal panel 1. Except for the above-described differences in the liquid crystal display apparatus 30 of the present embodiment, the structure and operation are the same as the liquid crystal display apparatus of the second embodiment described above.

In the liquid crystal display apparatus 30 of the present embodiment, the LEDs 4 are not liable to vary in position when pressure is externally applied, and the occurrence of brightness nonuniformity in the display image can be reduced because the LEDs 4 are mounted on the glass epoxy substrate of the touch panel 2. Application can also be made when there is a large number of LEDs 4 and a large electric current must be fed to the I/F FPC substrate, because an backlight I/F FPC substrate 6 and a touch-panel I/F FPC substrate 3 are separately provided. Since a shield plate is furthermore not provided, the apparatus can be made thinner in comparison with the liquid crystal display apparatus of the first and second embodiments described above.

What is claimed is:

1. A liquid crystal display apparatus, comprising:
   a liquid crystal panel;
   a backlight light guide plate which is disposed behind said liquid crystal panel and which supplies light to the liquid crystal panel;
   an electromagnetic-induction touch panel disposed behind said backlight light guide plate;
   an electromagnetic noise shield plate disposed behind said electromagnetic-induction touch panel; and
   a plurality of backlight light sources which is fixed to said electromagnetic-induction touch panel along side edges of said backlight light guide plate and is used to feed light to said backlight light guide plate,
   wherein light emitted from said plurality of backlight light sources enters said backlight light guide plate from a side surface of said backlight light guide plate that faces said plurality of backlight light sources.

2. The liquid crystal display apparatus according to claim 1, further comprising:
   a touch-panel wiring cable for feeding power and signals to said electromagnetic-induction touch panel; and
   a light-source wiring cable for feeding power to said plurality of backlight light sources.

3. The liquid crystal display apparatus according to claim 2, wherein said touch-panel wiring cable is a flexible printed substrate.

4. The liquid crystal display apparatus according to claim 1, wherein said plurality of backlight light sources is connected to the wiring substrate of said electromagnetic-induction touch panel, and a wiring cable for feeding power and signals to said electromagnetic-induction touch panel and feeding power to said plurality of backlight light sources is connected to said wiring substrate.

5. The liquid crystal display apparatus according to claim 4, wherein said wiring cable is a flexible printed substrate.

6. The liquid crystal display apparatus according to claim 1, wherein the apparatus is mounted in a mobile information terminal apparatus or a tablet personal computer.

* * * * *